INVENTORS C. A. LOVELL
O. J. MURPHY
BY William F. Simpson
ATTORNEY

INVENTORS C.A. LOVELL
O.J. MURPHY
BY William F. Simpson
ATTORNEY

July 16, 1957 C. A. LOVELL ET AL 2,799,730

HIGH SPEED POLYTONIC CALLING SIGNAL GENERATOR EMPLOYING KICK COIL

Filed May 27, 1953 3 Sheets-Sheet 3

INVENTORS C.A.LOVELL
O.J.MURPHY
BY William F. Simpson.
ATTORNEY 2,799,730
Patented July 16, 1957

2,799,730

HIGH SPEED POLYTONIC CALLING SIGNAL GENERATOR EMPLOYING KICK COIL

Clarence A. Lovell, Summit, N. J., and Orlando J. Murphy, New York, N. Y., assignors to Bell Telephone Laboratories, Incorporated, New York, N. Y., a corporation of New York Application May 27, 1953, Serial No. 357,728

7 Claims. (Cl. 179—90)

This invention relates to calling systems and more particularly to improved methods, apparatus and equipment for multifrequency high speed signaling arrangements which may be readily employed in the telephone and other signaling and calling systems.

More particularly, this invention relates to improving calling arrangements suitable for use in combination with receiving apparatus and equipment set forth in the copending application of C. A. Lovell, Serial No. 1,471, filed January 9, 1948, now Patent 2,658,189, granted November 3, 1953.

Said application discloses multifrequency calling arrangements wherein voice-frequency signals are employed to represent multisymbol, multidigit identification or subscribers' numbers. Each symbol, digit or numeral is transmitted from a calling station to a receiving station or device, which receiving device is usually located at a central switching point, by means of two different frequencies out of a total of five possibly different frequencies.

Similar types of signals are employed in the exemplary embodiment of this invention set forth in the present application which is directed to an improved subscriber's station equipment and method of operation thereof suitable for readily transmitting groups of such calling signals over a subscriber's line to a central control or switching point.

An object of the present invention is to provide an improved subscriber's station set and control equipment and methods of operation thereof to transmit signals to a receiving station more accurately, faster, with less equipment, and less expense, with a minimum of mechanically moving parts, and with a minimum of electrical contacts.

Another object of this invention is to provide means in such an improved signaling system for controlling equipment in such a manner that the called station identification or number may be set up on the subscriber's calling equipment and the setting of this equipment visually checked prior to placing the call. Thereafter, the call is placed and the signals representing the called subscriber's station designation rapidly and repeatedly transmitted for so long an interval of time as may be desired or required to establish a connection to the called line or station.

An object of this invention relates to methods and means of energizing a resonant circuit by means of an impulse derived from an alternating-current supply voltage.

Another object of this invention relates to the use of a saturable-core coil for shock-exciting one or more resonant circuits.

Another object of this invention relates to an impulse coil for generating impulses in combination with a plurality of rectifiers actuated by alternating current for selecting certain of the impulses generated by said coil.

Still another object of this invention relates to circuit arrangements, equipments and methods employing a saturable-core impulse generating coil in combination with a source of alternating current for simultaneously shock-exciting a plurality of resonant circuits once during each cycle of the alternating current.

Another object of this invention relates to circuits and equipment for substantially critically damping said oscillations in one or more resonant circuits.

A feature of this invention relates to the combination of a plurality of resonant circuits, a saturable-core magnetic impulse-generating coil, a manually settable selector device, a stepping switch and means for energizing both said stepping switch and said saturable-core impulse coil from a source of alternating current.

The foregoing objects and features of this invention may be more readily understood from the following description when read with reference to the drawing in which:

Figs. 1 to 4, inclusive, show in detail the structural features of the call selecting switch which is manually settable by the calling subscriber in accordance with the symbols or numerals designating the called station to be represented by the transmitted signals.

More particularly, Fig. 1 shows a front elevation of such a dial or settable device.

Figs. 5 through 9, inclusive, illustrate the structure of a stepping switch employed in combination with the dial or manually selectable switch shown in Figs. 1 to 4 for selecting the various elements of said settable device.

Figure 5:
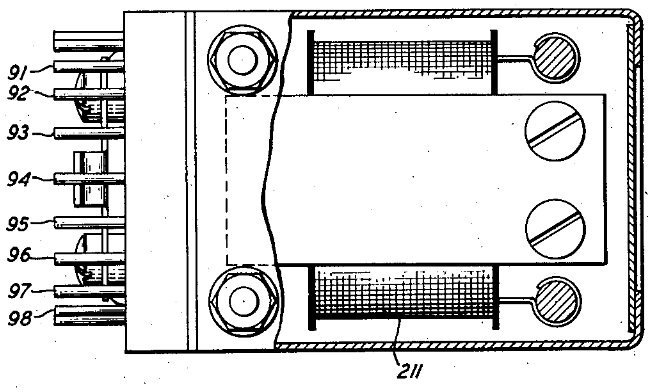
Figure 7:
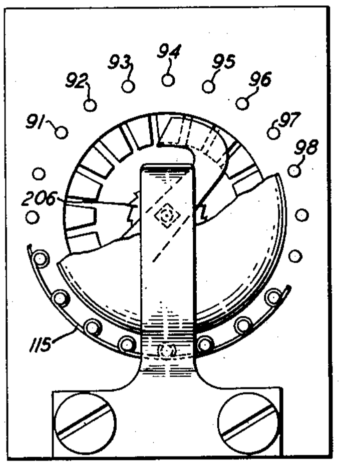
Figure 6:
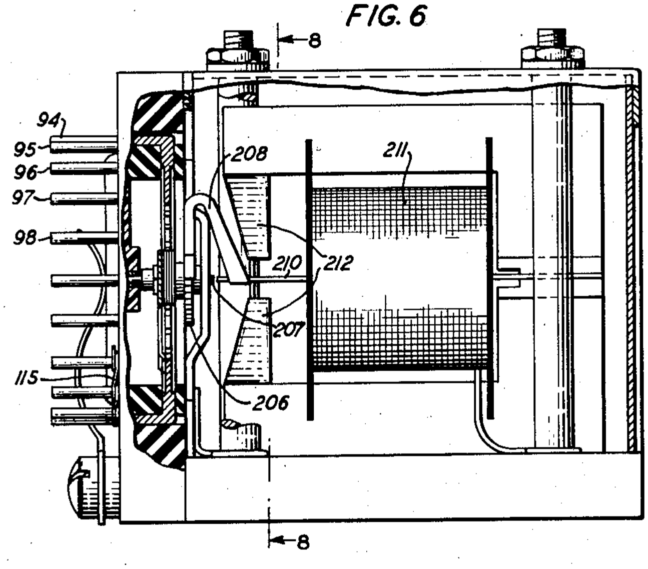
Figure 8:
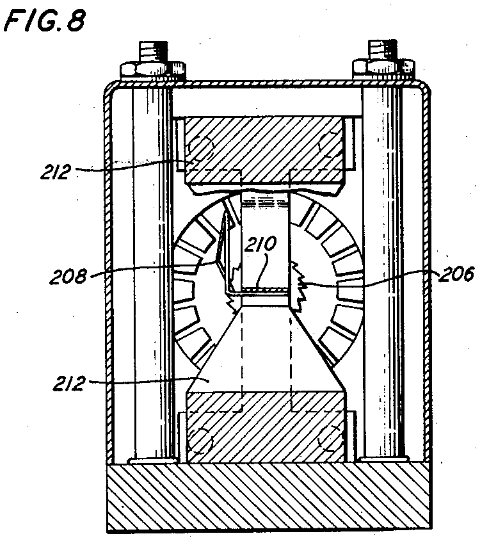
Figure 9:
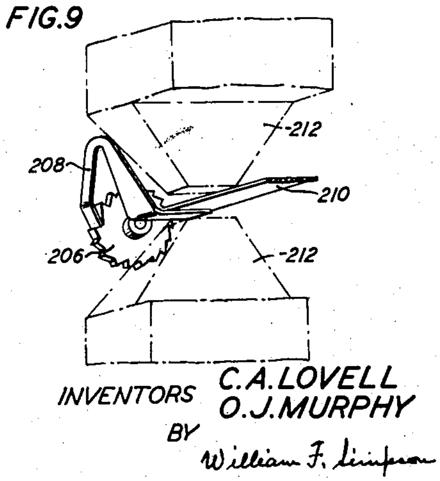
Figures 10, 11:
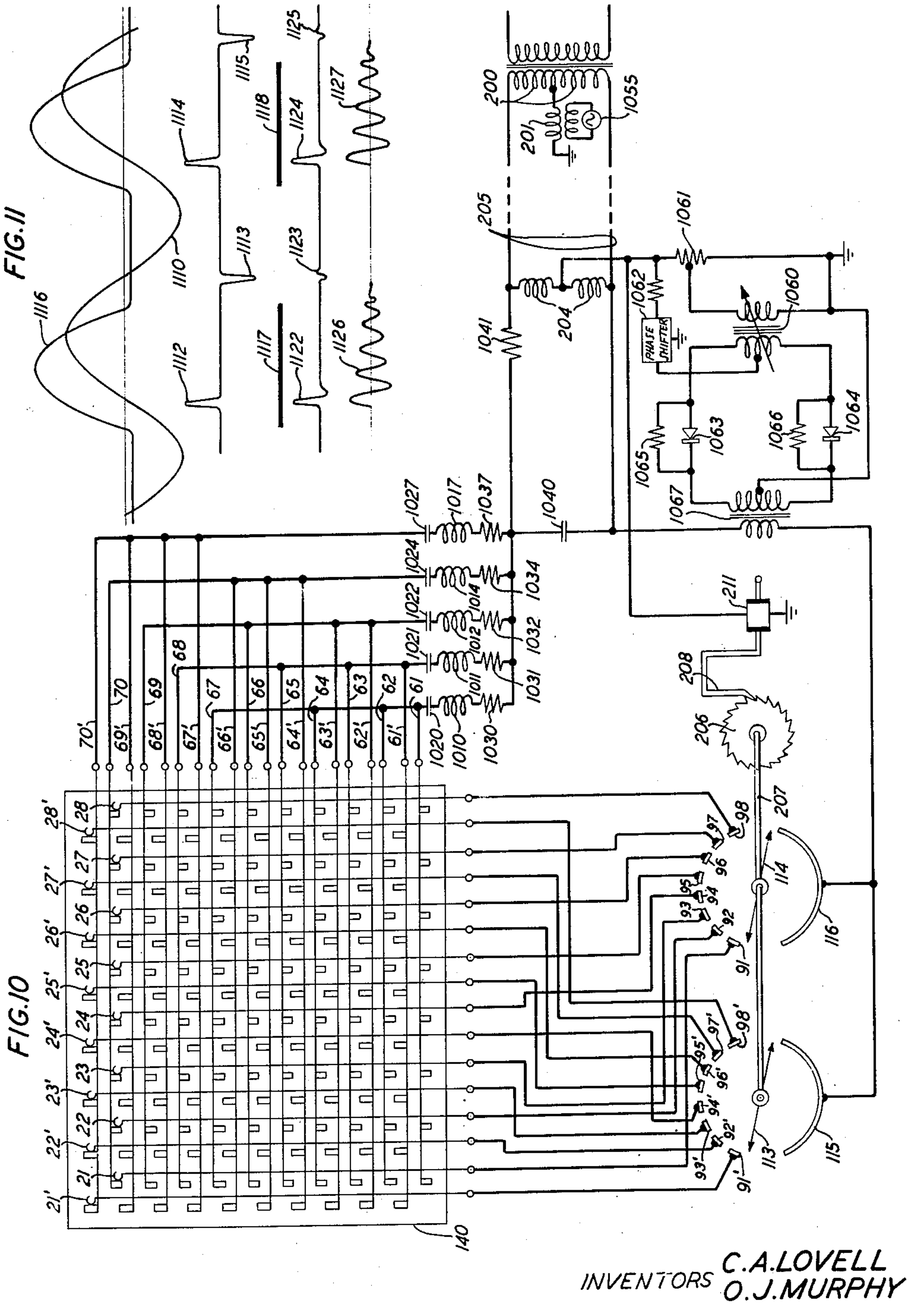

More particularly, Fig. 5 is a top view partly broken away of the stepping mechanism;

Fig. 6 is a side view partly broken away of the name stepping mechanism;

Fig. 7 is a front view partly broken away of the stepping mechanism;

Fig. 8 shows a section partly broken away taken along the section line 8—8 of Fig. 6;

Fig. 9 is a partial disclosure of the stepping magnet showing the pole-pieces and armature, the stepping pawl and ratchet wheel;

Fig. 10 shows the manner in which the dial or settable selecting device, the stepping mechanism, the resonant circuits, the saturable-core impulse coil, the related switching and interconnecting circuits and the other related equipment are interconnected and cooperate one with another to form an improved exemplary signaling system in accordance with this invention; and Fig. 11 is a graph illustrating the manner in which the impulse coil performs in response to an applied alternating-current voltage wave form.

The signal transmitting equipment located at the subscriber's station in accordance with the present invention has been devised to transmit code combinations of different voice-frequency signaling currents. It is to be understood, of course, that the invention does not require that voice-frequency currents be employed. Instead, signaling currents of any desired frequencies may be employed, provided that they are high compared to the frequency of the alternating-current voltage used to actuate the device.

In the exemplary embodiment of this invention set forth herein, signaling arrangements are employed which transmit a plurality of signals which satisfy the equations:

$$\int_0^{\tau} \theta_i(\lambda)\cdot\theta_j(\tau-\lambda)\,d\lambda=0,\ i\neq j \qquad (2a)$$

$$\int_0^{\tau} \theta_i(\lambda)\cdot\theta_j(\tau-\lambda)\,d\lambda=1,\ i=j \qquad (2b)$$

where $\theta_1(t)$, $\theta_2(t)$ . . . $\theta_n(t)$ represent a plurality of signaling functions which conform to or satisfy the above Equations 2*a* and 2*b*.

As pointed out in the above-identified copending application, the use of shock-excited oscillations which have a predetermined decrement, when applied to filter circuits having a similar dissipation constant or constants and which are tuned to the same frequencies satisfy Equations 2*a* and 2*b* and in accordance with these equations produce one or the other of two different results. When the frequency of the applied shock-excitations is in the prescribed set of frequencies but is different from that for which the filter under consideration is designed, the output of the filter will be substantially zero at the end of a predetermined time interval $\tau$, while the output of the filter will be a finite value when the applied alternating-current wave has the same frequency as the frequency for which the filter is designed. This output exists at the end of the same time interval $\tau$, as set forth in the above-identified copending application.

Referring first to the system shown in Fig. 10 of the drawing, 140 represents the manually settable device and dials, the structure of which is shown in Figs. 1, 2, 3 and 4. The distributor or stepping device includes the brush arms 113 and 114 and related contacts 91 through 98 and 91' through 98' and 115 and 116 as well as the driving magnet 211 and the ratchet wheel 206 and driving pawl 208. The details of the mechanical structure of an exemplary stepping device or distributor are shown in Figs. 5, 6, 7, 8 and 9. In addition, the subscriber's station or calling line is represented by conductors 205 which extend through a distant point usually at the central switching station where a source of alternating current 1055 is coupled to the line through transformer 201.

A group of five resonant circuits is shown in the center of Fig. 10. Each resonant circuit comprises a condenser, an inductance and a resistor. These elements are designated 1020, 1010 and 1030, respectively, for the first resonant circuit. For the second resonant circuit these elements are designated 1021, 1011 and 1031. For the third resonant circuit these elements are designated 1022, 1012 and 1032. In the fourth resonant circuit these elements are designated 1024, 1014 and 1034 while in the fifth resonant circuit these elements are designated 1027, 1017 and 1037.

As shown in Fig. 10 alternating current is applied to both the subscribers and calling line conductors and to ground by means of transformer 201. In other words, the center point of the coil of the transformer 200 is connected to the right-hand terminal of the secondary winding of transformer 201. In a similar manner, at the subscriber's or calling station a second set of coils 204 is provided to derive the alternating-current power from both of the line conductors. The center point of these coils is connected both to the stepping magnet 211 of the stepping distributor and also to phase shifting network or device 1062 and the voltage divider 1061. The alternating current then flows from these points to ground.

A saturable-core impulse generating coil 1060 has its primary or input windings connected to the voltage divider 1061. The secondary winding of this coil is connected through diodes 1063 and 1064 to the primary winding of the transformer 1067, the secondary winding of which is connected to the line circuit and, via the stepper and selector switches, to the resonant circuits. The phase shifting device or network 1062 is connected to the center point of the secondary winding of the impulse coil 1060 while the center point of the primary winding of the transformer 1067 is connected to ground. These circuit connections are employed to select impulses generated by the impulse coil 1060 in the manner described hereinafter.

Figures 1, 2:
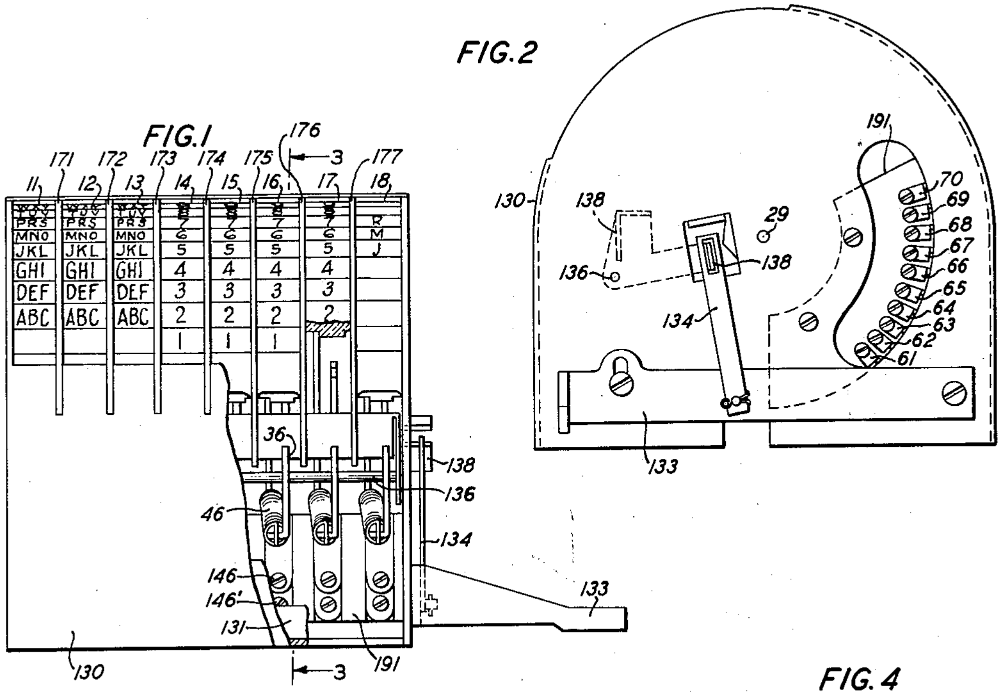
Fig. 2 shows an end view of the same device.
Figure 3:
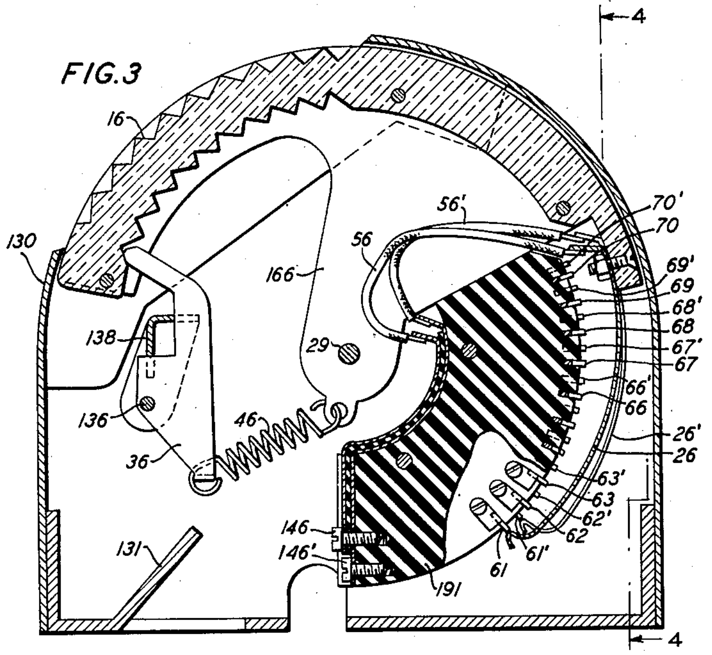
Fig. 3 shows a partially sectional view along lines 3—3 of Fig. 1.

Figs. 1, 2, 3 and 4 show one embodiment of the selector switch 140 which is enclosed in case 130, with selector dials 11 to 18 and release lever 133 accessible to an operator. The selector dials are made of a non-conducting material such as hard rubber or plastic, and each dial is provided with ten indentations along its outer periphery. Each indentation is designated by a letter or number conforming to the telephone signaling system, and each is of suitable configuration to permit an operator's finger to engage and move the dial. The selector dials are separated by spacers 171 to 177 which are attached to case 130. As indicated in Fig. 3, each dial is attached to an individual support 166 so that each dial may be moved approximately one-fourth of a revolution about shaft 29. The inner surface of each dial is provided with ten notches or grooves which correspond to the finger indentations on the outer periphery of the dial. The notches or grooves on each dial serve to engage with a detent pawl, to secure each dial in one of the ten possible positions as selected by the operator. As indicated in Fig. 3, detent pawl 36 which corresponds to dial 16 is pivoted about shaft 136. Spring 46 is attached between support 166 and pawl 36 so that pawl 36 is normally forced against dial 16, thereby securing the dial in a fixed position by engaging with one of the ten notches or grooves. Spring 46 also serves to apply a continuous force to support 166 which tends to rotate support 166 and dial 16 in a clockwise direction about shaft 29. The grooves or notches on the dials and the detent pawls are shaped and positioned so that by pressing upon the finger indentations in a dial an operator can move the dial in either direction and so that the ratchet action of the pawl against the notches secures the dial in any one of the ten positions to which it may be moved. The rotary movement of the dials is limited to about one-fourth of a revolution by stop 131 and insulator 191.

Release arm 138 is connected with release lever 133 through lever 134 and is provided with slots to engage each detent pawl. When lever 133 is in its normal position, arm 138 permits each detent pawl to engage with a groove in the corresponding dial. When lever 133 is depressed, arm 138 is moved in a clockwise direction as viewed in Fig. 2 about shaft 136 and the detent pawls are disengaged from the dials, thereby permitting the spring associated with each dial to cause each dial to return to its initial position.

Figure 4:
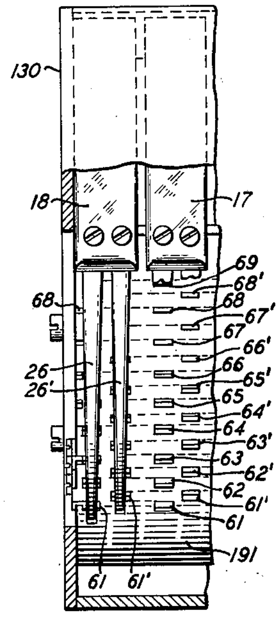
Fig. 4 shows a partially sectional view of Fig. 3 taken along lines 4—4.

In order to provide for simultaneously selecting two of the five resonant circuits two contact members are provided for each of the selector or dial members 11 through 18. These members are illustrated in Figs. 3 and 4 by springs 26 and 26' and are connected by means of flexible leads or wires 56 and 56' to the corresponding terminals or screws 146 and 146'. Each of the springs 26 is arranged to make contact with one of the bus bars 61 through 70 inclusive and each spring 26' is arranged to make contact with bus bars 61' through 70'. Thus in any position of the associated finger wheel or dial such as 16 of Fig. 3, brush or contact member 26 will make contact with one of the bus bars 61 through 70 and brush or contact member 26' will make contact with the corresponding bus bars 61' through 70'. The insulating member 191 extends along the rear of the selector mechanism and supports two sets of two bus bars 61 through 70 and 60' through 70' as indicated in the drawings. In this way connections are made between the selected resonant circuits and contacts or segments of the distributor mechanism shown in Figs. 5, 6, 7, 8 and 9 and illustrated in Fig. 10 by the contact segments 91 to 98 inclusive, and 91' through 98' inclusive.

Figs. 5, 6, 7, 8 and 9 indicate one embodiment of the stepping device and distributor. The distributor comprises two brushes 113 and 114 moving over two sets of contacts 91 to 98 and 91' to 98'. The brushes are driven by ratchet wheel 206 through shaft 207. The ratchet wheel is driven by stepping pawl 208 which is attached to magnetic reed 210. The magnetic structure is polarized by permanent magnets 212 and magnetic reed 210 is actuated by coil 211. When an alternating current is applied to coil 211, the magnetic polarity of reed 210 is changed each half cycle of the alternating current so that the reed moves both upward and downward during each cycle of the alternating current. Each time reed 210 moves downward ratchet wheel 206 is moved one step by the stepping pawl 208. Thus, ratchet wheel 206 and brushes 113 and 114 are moved one step during each cycle of the alternating current. As described herein the winding is connected in such a direction as to advance the brushes one step during the negative half cycles of the applied alternating-current power.

In the embodiment of this invention shown in Fig. 10 the alternating current for operating and energizing the stepping device is supplied from the mid-point of the windings 204 of the simplex coil. The stepping device is tuned and may in addition, when desired, include further circuits and apparatus to properly phase the stepping of the device so that it steps during portions of the alternating-current cycle during which no pulses are generated, i. e., during the negative portions of the applied alternating-current power.

In operating the calling device in accordance with this invention the subscriber will first position the dials or finger-wheels 11 through 18, inclusive, in accordance with the digits, characters or symbols of the called subscriber's station designation or number. This designation or number should then appear just above the edge of case 130 of the calling device. The subscriber can then check the accuracy of the setting of the device. If the subscriber has made any errors the subscriber may either set the individual finger-wheels to correct the error or the subscriber may actuate the resetting lever 133 and then start over again. In any event, when the subscriber has accurately positioned the finger-wheels and has had an opportunity to check the accuracy of the setting of the calling device, the subscriber may then place the call.

The actuation of the selecting devices or finger-wheels 11 through 18 causes the spring members 21 to 28 and 21' to 28' to connect and make contact with the bus bars 61 through 70 and 61' through 70'. In this manner, the pairs of resonant circuits including condensers 1020, 1021, 1022, 1024 and 1027 are selectively connected to contacts of the distributor mechanism with which the brush arms 113 and 114 cooperate.

Upon the initiation of a call the equipment at the subscriber's station will be conditioned and connected as shown in Fig. 10 of the drawing. Likewise, the equipment at the central station will be actuated to apply a source of alternating current such as 1055 to the subscriber's line in the manner described above for actuating the signaling equipment as described herein. In addition, a call signal receiver will be connected to the subscriber's line in any suitable manner such as through the coupling coils 200, or a coupling condenser.

Suitable switching equipment at the subscriber's station is disclosed in Patent 2,598,695, issued June 3, 1952, to H. E. Hill and D. B. Parkinson and in patent application of Dunlap-Malthaner, Serial No. 116,068, filed September 16, 1949 which issued as Patent 2,672,523 on March 16, 1954. Typical switching equipment at the central station may be employed in cooperation with other circuits of applicants' invention. Suitable switching equipment is disclosed in a patent application of Malthaner-Vaughan, Serial No. 115,961, filed September 16, 1949, which issued as Patent 2,655,559 on October 13, 1953. Of course, the receiver employed in such a system must be designed to cooperate with the multi-frequency signals generated by the subscriber's station equipment such as disclosed in the above-identified copending application of C. A. Lovell. Inasmuch as the circuits and equipment disclosed in the above-identified patent application operate in the usual manner as described in said application when used in combination with the invention herein, descriptions of these systems and apparatus have not been repeated herein.

Upon application of alternating current from source 1055, which may be of a relatively low power-frequency such as 45 cycles per second in an exemplary embodiment of this invention, to the subscriber's line at the central station the equipment at the subscriber's station in the exemplary embodiment shown in Fig. 10 is set into operation.

First to be considered is the stepping magnet or winding 211 which is energized whereupon the armature 210 vibrates and causes pawl 208 to advance the ratchet wheel 206 one step during each cycle of the applied alternating current. The armature 210 is polarized so that it will advance ratchet wheel 206 one step during each negative half cycle of the applied alternating current. The applied alternating-current wave form is represented by graph 1110 of Fig. 11. The stepping device is designed and tuned so that it will vibrate with the proper phase relationship to the applied alternating current to cause the ratchet wheel 206 to advance one step sometime during the middle portion of each negative half cycle of the applied alternating current.

Assume for purpose of illustration that the brush arms 113 and 114 are resting in the position shown in the drawings. Also assume that when alternating current is first applied to the system, it will be applied at a time near the beginning of a negative half cycle. The alternating current, of course, may have any phase when first applied to the system. Likewise, the brush arms 113 and 114 may be resting in any position when the alternating current is first applied to the system. However, the mode of operation is substantially the same and is more easily understood if it is assumed that the alternating current is applied to the system at a time near the beginning of a negative half cycle so that magnet 211 and armature 210 respond to this negative half cycle and cause brush arms 113 and 114 to engage the respective contacts 91' and 91.

Furthermore, assume that the first dial or finger-wheel 11 is set in position zero so that spring 21' engages bus bar 70' and spring 21 engages bus bar 70. Consequently, the resonant circuits including condensers 1024 and 1027 are connected in the signaling circuit at this time.

During the major portion of the negative half cycle of the applied alternating current the diodes or rectifiers 1063 and 1064 prevent the application of appreciable energy to the resonant circuits as will be described herein.

Impulse coil 1060 has its primary winding connected to the voltage divider 1061 which in turn is connected to the center point of coils 204 and thus to the alternating-current supply. The core of the impulse coil 1060 is designed so that it is saturated by the applied alternating current at substantially all times except for a short interval of time when the applied alternating-current wave form passes through zero. At these times, pulses of voltage are induced in the output or secondary winding of this coil. These pulses of voltage are represented by 1112, 1113, 1114 and 1115 of Fig. 11. The pulses 1112 and 1114 are shown to be positive when the applied alternating-current wave form 1110 passes through zero in the positive direction, i. e., from negative to positive. The pulses 1113 and 1115 are of opposite polarity, i. e., negative, when the applied alternating-current wave form passes through zero in the opposite direction, i. e., from positive to negative. Of course, the polarity of all of the pulses of the secondary may be reversed relative to the polarity of the wave form on the primary side of the impulse coil by interchanging the connections of either the primary winding or the secondary winding.

In addition, the alternating current from the center point of coils 204 is also applied through phase shifting network or device 1062 to the center point of the secondary winding of the impulse coil 1060 and there divides, half flowing through the rectifier network comprising rectifier 1063 and resistor 1065 and the other half through the network comprising rectifier 1064 and resistor 1066; the currents recombine at the center point of the primary winding of the transformer 1067 and then return to ground. The alternating current flowing over the above-described path from the center of the secondary winding of the impulse coil 1060 to the center of the transformer 1067 flows in opposite directions through both halves of these coils and thus produces no magnetic effect upon the cores of these coils. The transformer coil 1067 does not saturate but rather is employed to repeat the pulses generated in the secondary winding of the impulse coil 1060 to the signaling circuit and the resonant circuits.

During the positive half cycle of the alternating current from the phase shifting device 1062, the rectifiers 1063 and 1064 have very small resistance because the polarity of the applied voltage is such that current can readily flow through these devices. However, during the negative half cycles of the alternating current from the phase shifting device 1062, rectifiers 1063 and 1064 have a relatively high impedance and prevent substantial current from flowing through them. The wave form of the current flowing through these rectifiers and coil windings from the phase shifting device 1062 is represented by curve 1116 of Fig. 11. As illustrated by this curve the positive half cycles are of substantially a sine wave form while the negative half cycles are cut off or largely suppressed. Thus, the rectifiers 1063 and 1064 operate as switches and cause the conducting path between the secondary of the impulse coil 1060 and the repeating transformer 1067 to be substantially opened and closed during alternate half cycles of the applied alternating current. The time that the rectifiers 1063 and 1064 are conducting is illustrated by the line segments 1117 and 1118 of Fig. 11. As shown in this figure, the phase shifting device is adjusted so that the rectifiers become conducting slightly before the positive pulses are generated by the impulse coil 1060 so these positive pulses are applied to the repeating transformer 1067 whereas the negative half cycles generated by the impulse coil are substantially eliminated or greatly reduced due to the high impedance of the rectifiers 1063 and 1064. Thus, in response to the positive pulses 1112 and 1114 applied to the primary winding of transformer 1067 pulses 1122 and 1124, respectively, appear in the output circuit of this transformer. However, when these diodes are biased to their high resistance condition due to the alternating current from the phase shifting device 1062, the negative pulses 1113 and 1115 which occur at these times, are greatly attenuated so substantially little or no pulse appears in the secondary winding of the transformer 1067 at these times. These pulses are represented at 1123 and 1125 in Fig. 11. No attempt has been made in Fig. 11 to actually show the relative magnitudes between the pulses 1122 and 1123, etc. because in the usual case the pulses 1123 and 1125 are so small they would not be observed when drawn to the same scale as pulses 1122 and 1124.

The occurrence of each of the pulses 1122, 1124, etc. at the circuit of the secondary winding of transformer 1067 causes the resonant circuits connected to the secondary of transformer 1067 to be shock-excited and generate damped alternating-current wave forms. The frequency and decrement of the wave form is determined by the values of the elements of the resonant circuits. Such wave forms are illustrated in Fig. 11 by the wave forms 1126 and 1127. One circuit for applying the pulses 1122, 1124, etc. to the resonant circuits may be traced from the lower terminal of the secondary winding of transformer 1067 through brush arm 113 to segment 91' and then to brush 21' and then to bus bar 70' to the upper terminal of condenser 1027 of the fifth resonant circuit. The circuit then extends through the inductor 1017 and resistor 1037 of the resonant circuit and then through the common coupling condenser 1040 to the upper terminal of the secondary winding of transformer 1067. A similar circuit may be traced through the brush arm 114, segment 91, brush 21, bus bar 70 and then through the fourth resonant circuit comprising condenser 1024, inductor 1014 and resistor 1034, and thence through condenser 1040.

The graphs 1126 and 1127 show only a single frequency from one of the resonant circuits. However, a frequency will be present for each of the resonant circuits which are shock-excited.

The portions of the time of the applied alternating-current wave form during which the core of the impulse coil 1016 is not saturated and thus the duration of the pulses 1112 and 1122 may be controlled by controlling the saturation of the core of the impulse coil 1060. This time is not critical but should preferably be adjusted to have a duration considerably shorter than that of a single cycle of the alternating currents generated in the various resonant circuits shown in the middle of Fig. 10.

So long as the recifiers 1063 and 1064 are biased in their conducting direction by the alternating current applied from phase shifting device 1062 the impedance seen by the primary of transformer 1067 is relatively low, first because the impedance of the rectifiers 1063 and 1064 is low and second because the impedance of the saturable coil 1060 when the core is saturated is also quite low. As a result, the wave forms 1126, 1127, etc. have a decrement largely determined by the resistors of the resonant circuits. A coupling condenser 1040 is designed to have a relatively low impedance so that the leakage resistance of the line and its terminating impedance do not materially change the decrement of the alternating current generated in the resonant circuits.

As shown in Fig. 10 the line conductors of line 205 are connected or coupled to condenser 1040 through the coupling or decoupling resistor 1041 so that the voltage drop across this condenser is applied to the line conductors thus causing a corresponding signal to be transmitted to the central office.

When the bias applied to the rectifiers 1063 and 1064 is reversed so that the rectifiers are biased to their high resistance condition then the impedance seen by the primary winding of transformer 1067 changes so that in effect the resistors 1065 and 1066 are connected in series across the primary winding of this transformer. Resistors 1065 and 1066 are much higher than the resistance of the rectifiers 1063 and 1064 when these rectifiers are biased in the conducting direction. However, when these rectifiers are biased in the non-conducting direction then the resistors 1065 and 1066 are effectively added to the resonant circuits through the coupling transformer 1067. These resistors are chosen to be of such a magnitude that they tend to rapidly damp out all of the alternating currents which may be flowing in any of the resonant circuits at this time. Thereafter, the brush arms 113 and 114 advance to the second position and the above-described series of operations is repeated for each position of the distributor device.

After pulses representing each of the numerals of the subscriber's number or designation are transmitted the brush arms 113 and 114 will not engage any terminals during two steps thereof with the result that a pause or blank interval is transmitted having a duration of substantially two pulse intervals which pause or blank interval signifies that one complete series of signals representing a called subscriber's station has been transmitted and that another cycle of operations will follow. The above cycles of operation are then repeated so long as the alternating current is applied to the subscriber's line. As a result, the exemplary embodiment of the calling arrangement in accordance with this invention repeatedly transmits pairs of alternating-current pulses having different frequencies representing the various symbols or numerals of the called station's number or designation so long as the alternating current is applied to the subscriber's station over the subscriber's line and so long as the subscriber desires to make such a call. The voltage is removed at the central office when the desired connections are made, thus stopping the generation of the signals and leaving the line available for speech or other signals.

Upon the termination of the call the subscriber restores the equipment to normal except that the dials of the finger-wheels of the selecting device 140 may be maintained in their previously set position. Thus, if the called line is busy and the subscriber wishes to make a call to this same line a short interval of time later he may do so with a minimum of effort. Of course, the dials or finger-wheels may be restored to normal, if desired, by the operation of reset lever 133.

It is to be understood that the above-described arrangements are illustrative of the application of the principles of the invention and that numerous other arrangements may be devised by those skilled in the art without departing from the spirit and scope of this invention.

What is claimed is:

1. A calling arrangement comprising in combination, a plurality of resonant circuits each for generating damped alternating currents of predetermined frequency and decrement, an impulse generating coil having a saturable core, apparatus for applying an alternating current to said coil of sufficient magnitude to saturate said core during the major portion of each cycle thereof and interconnecting means connected between said coil and said resonant circuits for shock-exciting said resonant circuits by impulses generated by said impulse coil.

2. A calling arrangement comprising in combination, a plurality of resonant circuits each for generating damped alternating currents of predetermined frequency and decrement, an impulse generating coil having a saturable core, apparatus for applying an alternating current to said coil of sufficient magnitude to saturate said core during the major portion of each cycle thereof and interconnecting means connected between said coil and said resonant circuits for shock-exciting said resonant circuits by impulses generated by said impulse coil, a calling line and apparatus interconnecting said line with said resonant circuits for conveying voltages derived from said shock-excited alternating currents to said line.

3. In a calling arrangement in combination, a calling line, a calling station connected thereto including a plurality of resonant circuits each for generating a damped alternating current of predetermined frequency and decrement, a plurality of manually selectable devices each constructed to be selectively interconnected with pairs of said resonant circuits, a distributor mechanism for successively connecting said manually selectable devices to said line, means for connecting said resonant circuits with said line, an impulse coil having a saturable core, means for connecting said coil to a source of alternating current of sufficient magnitude to saturate said core during the major portion of each cycle of said alternating current, means for interconnecting said impulse coil with said selected resonant circuits to shock-excite said selected resonant circuits for generating the corresponding alternating currents of predetermined frequency and decrement and apparatus for conveying voltages derived from said shock-excited alternating currents to said line.

4. In a telephone calling arrangement, a calling line, calling apparatus comprising in combination a plurality of resonant circuits each for generating damped alternating currents of predetermined decrement and a frequency different from the frequencies generated by each of the other of said resonant circuits, a distributor mechanism having a plurality of contacts, a stepping mechanism for stepping said distributor mechanism successively over said contacts, means for applying an alternating current to said stepping mechanism to actuate said stepping mechanism once during each half cycle of predetermined polarity of said alternating current, a plurality of manually settable devices for selectively connecting pairs of said resonant circuits to different contacts of said distributor mechanism, an impulse generating coil having a saturable core of magnetic material, means for applying the same alternating-current source to said impulse coil for saturating said core during an appreciable portion of each half cycle of said alternating-current, switching means for interconnecting said impulse coil with said resonant circuit, apparatus controlled by said alternating current for actuating said switching means to effectively connect said impulse coil to said resonant circuits during each half cycle of said alternating current of polarity opposite to the polarity of the half cycles actuating said distributor stepping means.

5. In a telephone calling arrangement comprising in combination, an electrically resonant circuit for generating damped alternating currents of predetermined frequency, an impulse generator for generating impulses of short duration, interconnecting circuit means for interconnecting said impulse generator and said resonant circuit for shock-exciting said resonant circuit by impulses generated by said impulse generator, an impedance element connected in said resonant circuit, interconnecting apparatus connected between said impedance element of said line for transmitting a voltage derived from voltage across said impedance element to said line.

6. In a telephone system, calling apparatus comprising in combination a calling line, an electrically resonant circuit for generating damped alternating currents of predetermined frequency and decrement, an impulse generator for generating impulses of short duration, interconnecting circuit means for interconnecting said impulse generator with said generator circuit for shock-exciting said resonant circuit by impulses generated by said impulse generator, a reactive impedance element connected in said resonant circuit, interconnecting circuits connected between said impedance elements of said line for applying a voltage derived from said reactive impedance element to said line.

7. In a telephone system, a calling arrangement comprising in combination a plurality of resonant circuits, each for generating damped alternating currents of predetermined frequency and decrement, an impulse generating coil having a saturable core interconnected with said resonant circuits, apparatus for applying an alternating current to said coil of sufficient magnitude to saturate the core of said coil during the major portion of each cycle for said applied alternating current, circuit means interconnected between said coil and said resonant circuit for shock-exciting said resonant circuits by impulses generated by said impulse generating coil, a capacitative impedance element connected to said resonant circuits, interconnecting circuit means connected between said impedance element of said line for applying a voltage derived from said impedance element to said line.

References Cited in the file of this patent

UNITED STATES PATENTS

| | | |
|---|---|---|
| 2,228,113 | Hersey | Jan. 7, 1941 |
| 2,594,300 | Dunlap et al. | Apr. 29, 1952 |